(12) United States Patent
Nagasaka

(10) Patent No.: US 12,537,583 B2
(45) Date of Patent: Jan. 27, 2026

(54) RESPONDER AND POSITIONING SYSTEM

(71) Applicant: SEIKO EPSON CORPORATION, Tokyo (JP)

(72) Inventor: Kimio Nagasaka, Hokuto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/797,768

(22) Filed: Aug. 8, 2024

(65) Prior Publication Data

US 2025/0055546 A1 Feb. 13, 2025

(30) Foreign Application Priority Data

Aug. 8, 2023 (JP) ................................ 2023-129398

(51) Int. Cl.
*H04B 7/06* (2006.01)
*H04B 7/08* (2006.01)

(52) U.S. Cl.
CPC ........... *H04B 7/0639* (2013.01); *H04B 7/086* (2013.01)

(58) Field of Classification Search
CPC .............................. H04B 7/0639; H04B 7/086
See application file for complete search history.

(56) References Cited

U.S. PATENT DOCUMENTS

| | | | | |
|---|---|---|---|---|
| 4,011,562 A | * | 3/1977 | Bruce | ....................... G01S 5/14 |
| | | | | 342/125 |
| 7,580,378 B2 | * | 8/2009 | Carrender | ............... G01S 13/84 |
| | | | | 370/278 |
| 9,485,037 B1 | * | 11/2016 | Weller | ...................... H01Q 9/32 |
| 2007/0290806 A1 | * | 12/2007 | Greeff | ...................... H04B 5/77 |
| | | | | 340/10.3 |

FOREIGN PATENT DOCUMENTS

JP 2000091844 A 3/2000

\* cited by examiner

*Primary Examiner* — Freshteh N Aghdam
(74) *Attorney, Agent, or Firm* — CHIP LAW GROUP

(57) ABSTRACT

A responder that receives an interrogation wave from an interrogator and transmits a response wave to the interrogator includes a plurality of antennae receiving the interrogation wave, a reference signal generator generating a reference signal, a plurality of modems outputting quadrature phase amplitudes based on reception signals output from the antennae when the interrogation wave is received and the reference signal, a parallel-time-series signal converter converting a parallel signal having the quadrature phase amplitude output from each of the modems into a time-series signal, a frequency divider outputting a frequency division signal having a frequency and a phase for detecting the time-series signal, a multiplier outputting a multiplication signal obtained by multiplying the time-series signal by the frequency division signal, and a beam selector determining an arrival direction of the interrogation wave based on the multiplication signals.

8 Claims, 7 Drawing Sheets

RESPONDER AND POSITIONING SYSTEM

The present application is based on, and claims priority from JP Application Serial Number 2023-129398, filed Aug. 8, 2023, the disclosure of which is hereby incorporated by reference herein in its entirety.

BACKGROUND

1. Technical Field

The present disclosure relates to a responder and a positioning system.

2. Related Art

In related art, various responders that receive interrogation waves from interrogators and transmit response waves to the interrogators are used. In such a responder, an interrogation wave reaches the responder through a plurality of propagation paths of a direct wave, a reflected wave, and the like, and thereby, a phase difference corresponding to a difference in propagation distance is generated. There is known so-called multipath that the components of the wave overlap to cause a decrease in reception intensity, a phase shift, or the like, and adversely affect the quality of a received signal in the responder. In order to suppress the influence of multipath, for example, JP-A-2000-91844 proposes a method of separating a direct wave and a reflected wave from an interrogation wave by measuring an arrival direction and an arrival delay time of a signal arriving at an antenna and obtaining a PDA (Power, Delay, Angle) profile.

JP-A-2000-91844 is an example of the related art.

However, in the responder disclosed in JP-A-2000-91844, in order to obtain a PDA profile, it is necessary to execute a calculation flow such as an FFT-MUSIC method using fast Fourier transform (FFT). Further, in order to extract a signal arriving from a specific direction based on the PDA profile, it is necessary to calculate a weight to give directivity. As described above, in order to determine the arrival direction of the signal based on the PDA profile, a large number of product-sum calculations are required and take a considerable time. In the responder of related art as disclosed in JP-A-2000-91844, the large number of product-sum calculations are performed by software.

SUMMARY

According to an aspect of the present disclosure, there is provided a responder that receives an interrogation wave from an interrogator and transmits a response wave to the interrogator, including a plurality of antennae receiving the interrogation wave, a reference signal generator generating a reference signal, a plurality of modems outputting quadrature phase amplitudes based on reception signals output from the antennae when the interrogation wave is received and the reference signal, a parallel-time-series signal converter converting a parallel signal having the quadrature phase amplitude output from each of the modems into a time-series signal, a frequency divider outputting a frequency division signal having a frequency and a phase for detecting the time-series signal, a multiplier outputting a multiplication signal obtained by multiplying the time-series signal by the frequency division signal, and a beam selector determining an arrival direction of the interrogation wave based on the multiplication signals.

DESCRIPTION OF EMBODIMENTS

Figure 1:
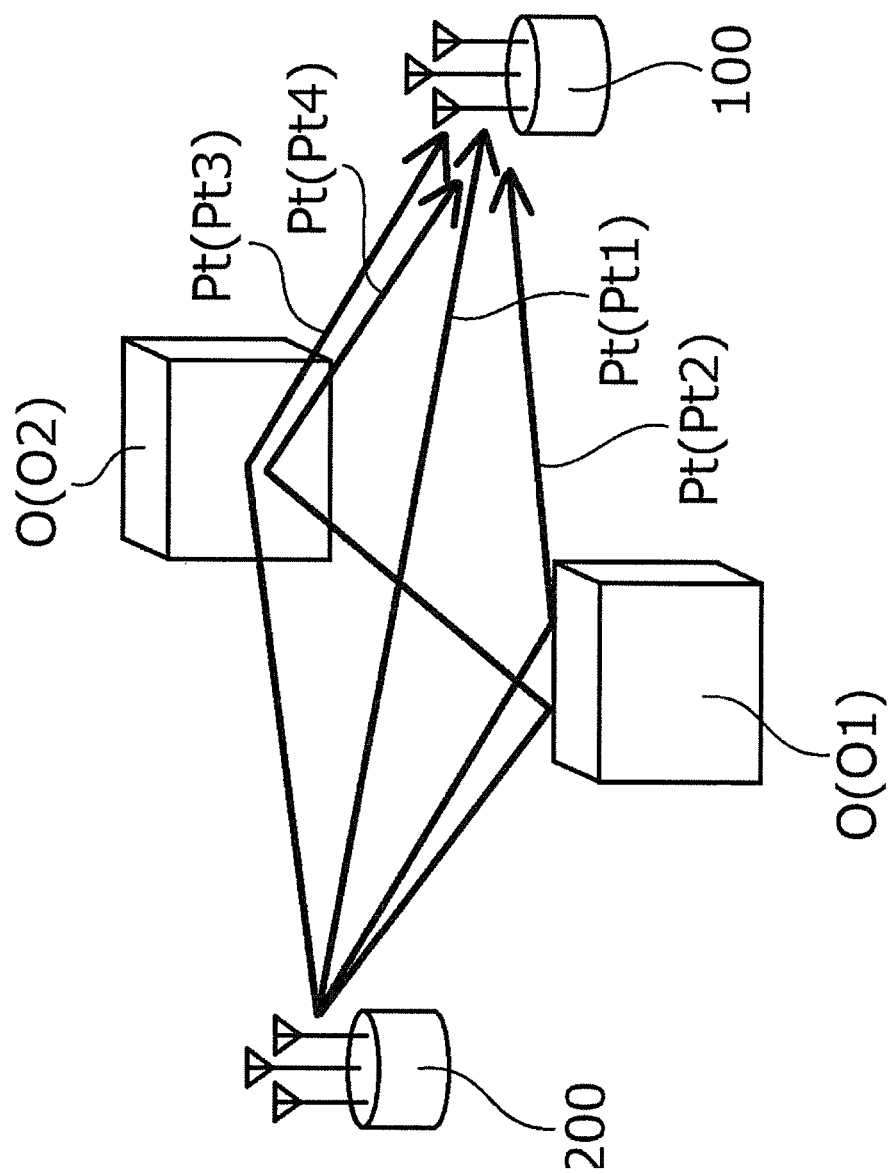
FIG. 1 shows a usage example of a responder according to one embodiment of the present disclosure.

First, the present disclosure will be schematically described.

A responder in a first aspect of the present disclosure for solving the above problem is a responder that receives an interrogation wave from an interrogator and transmits a response wave to the interrogator, including a plurality of antennae receiving the interrogation wave, a reference signal generator generating a reference signal, a plurality of modems outputting quadrature phase amplitudes based on reception signals output from the antennae when the interrogation wave is received and the reference signal, a parallel-time-series signal converter converting a parallel signal having the quadrature phase amplitude output from each of the modems into a time-series signal, a frequency divider outputting a frequency division signal having a frequency and a phase for detecting the time-series signal, a multiplier outputting a multiplication signal obtained by multiplying the time-series signal by the frequency division signal, and a beam selector determining an arrival direction of the interrogation wave based on the multiplication signals.

According to this aspect, the responder includes the antennae, the reference signal generator, the modems, the parallel-time-series signal converter, the frequency divider, the multiplier, and the beam selector. Thereby, calculation for suppressing the influence of multipath using fast Fourier transform or the like may be performed using hardware instead of software. Accordingly, the influence of multipath can be suppressed in a short time.

In the responder in a second aspect of the present disclosure according to the first mode, the frequency divider changes a frequency division ratio of the frequency division signal with time, and the beam selector determines the arrival direction based on intensity of the multiplication signals.

According to the mode, the arrival direction is determined based on the intensity of the multiplication signals generated based on the frequency division signals having the frequency division ratios changed with time. Therefore, the arrival direction can be determined by serial detection.

In the responder in a third aspect of the present disclosure according to the first aspect, the frequency divider outputs a plurality of the frequency division signals having different frequency division ratios from one another, and the beam selector determines the arrival direction based on intensity of the multiplication signals.

According to the mode, the arrival direction is determined based on the intensity of the multiplication signals generated based on the plurality of frequency division signals having different frequency division ratios from one another. Therefore, the arrival direction can be determined by parallel detection.

The responder in a fourth aspect of the present disclosure according to the first aspect includes an arrival direction memory unit storing a frequency division ratio as arrival direction information of the interrogation wave output from the beam selector, and a quadrature phase amplitude memory unit storing the quadrature phase amplitude, wherein the frequency divider outputs a response wave frequency division signal having a frequency corresponding to the frequency division ratio as the arrival direction information to the multiplier, the multiplier multiplies the response wave frequency division signal by a response wave time-series signal based on the quadrature phase amplitude stored in the quadrature phase amplitude memory unit and outputs a response wave multiplication signal to the parallel-time-series signal converter, the parallel-time-series signal converter converts the response wave multiplication signal into a response wave parallel signal and outputs the response wave parallel signal to the modem, the modem generates the response wave having a response wave quadrature phase amplitude corresponding to the response wave parallel signal based on a response wave reference signal, and the plurality of antennae transmit the response wave to the interrogator.

According to the mode, the frequency divider outputs the response wave frequency division signal to the multiplier, the multiplier outputs the response wave multiplication signal to the parallel-to-time-series signal converter, the parallel-to-time-series signal converter converts the response wave multiplication signal into the response wave parallel signal and outputs the response wave parallel signal to the modem, the modem generates the response wave having the response wave quadrature phase amplitude, and the antenna transmits the response wave to the interrogator. According to the configuration, the response wave may be preferably transmitted to the interrogator while suppressing the influence of multipath in a short time.

The responder in a fifth aspect of the present disclosure according to the first aspect includes a reception time discriminator discriminating a reception time, at which the interrogation wave is received by the antenna, based on a predetermined signal component contained in the multiplication signal.

According to the mode, the responder includes the reception time discriminator discriminating the reception time at which the interrogation wave is received by the antenna. Therefore, the reception time of the interrogation wave can be grasped, and for example, the timing of transmitting the response wave to the interrogator can be preferably set based on the reception time of the interrogation wave.

The responder in a sixth aspect of the present disclosure according to the fourth aspect further includes a reception time discriminator discriminating a reception time, at which the interrogation wave is received by the antenna, based on a predetermined signal component contained in the multiplication signal, wherein the beam selector determines an output time of the response wave frequency division signal based on the reception time.

According to the mode, the responder includes the reception time discriminator discriminating the reception time when the interrogation wave is received by the antenna, and the beam selector determines the output time of the response wave frequency division signal based on the reception time. Therefore, the timing of transmitting the response wave to the interrogator may be preferably set.

A positioning system in a seventh aspect of the present disclosure includes the responder according to any one of the first to sixth modes, the interrogator, a distance calculator calculating a distance from the interrogator to the responder, and a position detector measuring a position of the responder, wherein the interrogator outputs the interrogation wave containing a predetermined signal pattern and having directionality, the distance calculator calculates the distance from the interrogator to the responder based on a difference between a time when the interrogation wave is transmitted from the interrogator and a time when the response wave transmitted from the responder is received by the interrogator and a predetermined holding time, and the position detector measures the position of the responder based on the distance.

According to the mode, the interrogator outputs the interrogation wave containing the specific signal pattern, the distance calculator calculates the distance from the interrogator to the responder based on the difference between the time when the interrogation wave is transmitted from the interrogator and the time when the response wave transmitted from the responder is received by the interrogator and the predetermined holding time, and the position detector measures the position of the responder based on the distance. According to the configuration, the position of the responder can be accurately measured.

The positioning system in an eighth aspect of the present disclosure according to the seventh aspect includes a mechanical body having a movable part and a fixed part, wherein the interrogator is provided in the fixed part, and the responder is provided in the movable part.

According to the mode, the interrogator is provided in the fixed part, and the responder is provided in the movable part. According to the configuration, the position of the responder provided in the movable part can be accurately measured.

As below, embodiments according to the present disclosure will be described with reference to the accompanying drawings. A responder 100 of the present disclosure is a responder that receives an interrogation wave Pt from an interrogator 200 and transmits a response wave Pr to the interrogator 200 (see FIG. 2). First, a usage example of the responder 100 according to one embodiment of the present disclosure will be described with reference to FIG. 1.

As shown in FIG. 1, when receiving the interrogation wave Pt from the interrogator 200, the responder 100 receives a direct wave directly reaching the responder 100 from the interrogator 200 and a reflected wave reflected by an object O and reaching the responder 100 from the interrogator 200. In FIG. 1, the direct wave is referred to as a direct wave Pt1, the reflected wave reflected only by an object O1 and reaching of the reflected waves is referred to as a reflected wave Pt2, the reflected wave reflected only by an object O2 and reaching of the reflected waves is referred to as a reflected wave Pt3, and the reflected wave reflected by the object O1 and the object O2 and reaching of the reflected waves is referred to as a reflected wave Pt4.

Generally, a reflected wave transmitted from the interrogator 200 reaches the responder 100 later than a direct wave. Further, the same applies to a case where the interrogator 200 receives the response wave Pr returned from the responder 100 to the interrogator 200. Accordingly, radio waves propagated through different paths reach at different times, in other words, when a component of a direct wave and a component of a reflected wave are mixed, and thereby, a reception waveform may become dull and an influence of the so-called multipath may be caused. As a method for suppressing the influence of the multipath, there is a method of separating the direct wave Pt1 and the reflected waves Pt2 to Pt4 from the interrogation wave Pt.

Figure 2:
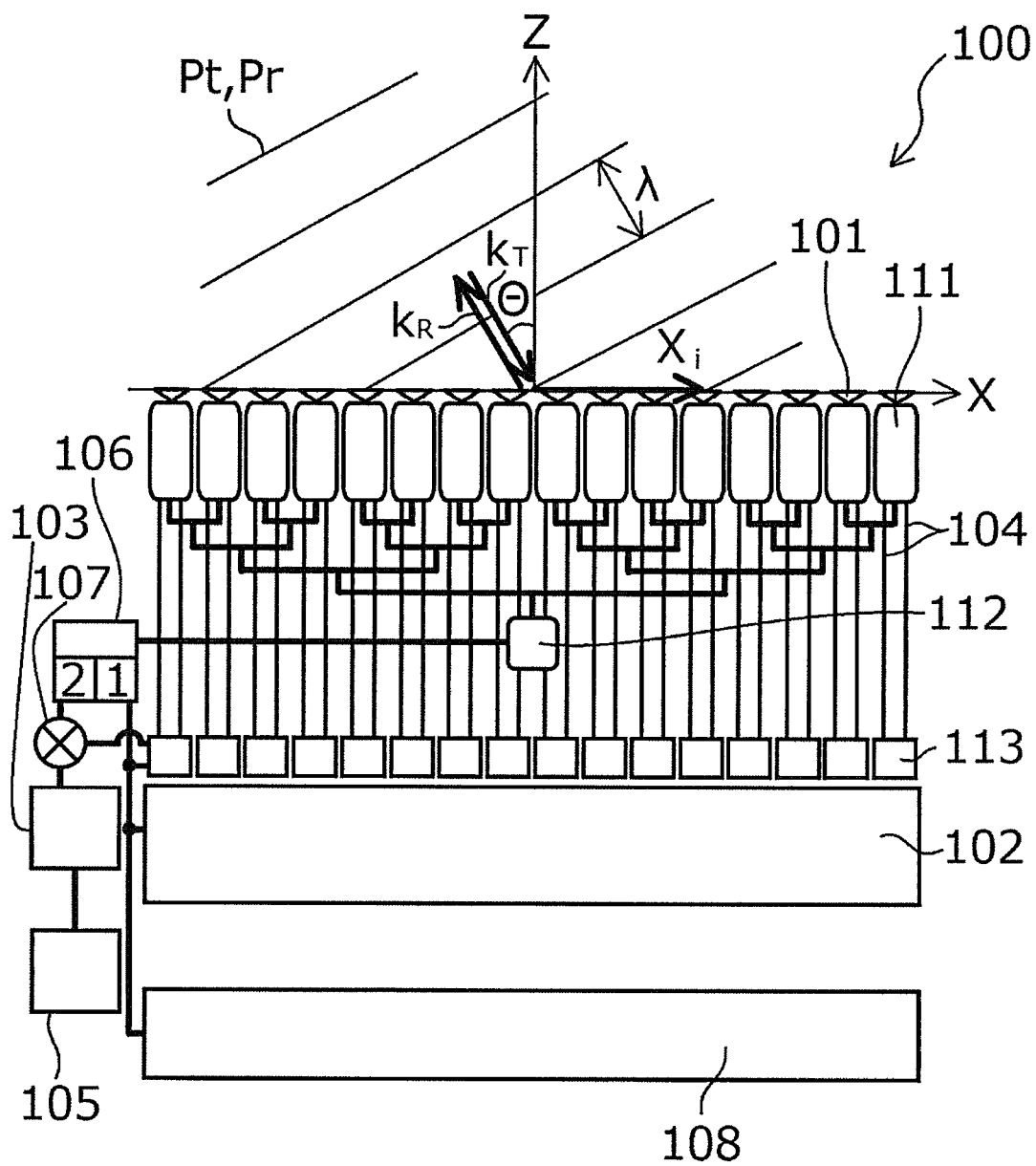
FIG. 2 shows a configuration of the responder according to the one embodiment of the present disclosure.

As below, the details of the responder 100 of one embodiment of the present disclosure that can separate the direct wave and the reflected wave from the interrogation wave Pt will be described with reference to FIGS. 2 to 5. First, an operation when the responder 100 receives the interrogation wave Pt will be described together with a configuration of the responder 100 with reference to FIG. 2. FIG. 2 shows both a state in which the interrogation wave Pt having a wavelength λ is received by the responder 100 and a state in which the response wave Pr having the wavelength λ is transmitted from the responder 100. Specifically, a state in which, using the responder 100 having an array antenna in which receiving surfaces of antennae 101 are arranged in a planar shape in an X direction and a Y direction orthogonal to the X direction in FIG. 2, the interrogation wave Pt is received by the responder 100 from a direction inclined by an angle θ with respect to a Z direction in FIG. 2 orthogonal to the receiving surfaces of the antennae 101 and the response wave Pr is transmitted from the responder 100 in a direction opposite to the reception direction is shown.

The interrogation wave Pt is, for example, a radio wave (electromagnetic wave) having a waveform obtained by modulation of various kinds of information including ID (IDENTIFICATION) information as an identification number for identifying the responder 100 to receive and synchronization information by an appropriate method. For the modulation method, phase modulation, amplitude modulation, quadrature frequency division multiplexing, or the like can be selected. For the carrier waves as the interrogation wave Pt and the response wave Pr, microwaves, millimeter waves, terahertz waves, or the like can be used.

The antenna 101 has a function of receiving the interrogation wave Pt, and a plurality of the antennae are arranged in one dimension (for example, in the X direction in FIG. 2) or two dimensions (for example, the X direction and the Y direction intersecting the X direction in FIG. 2) at regular intervals to form the array antenna. Although the responder 100 of the embodiment has the array antenna in which the antennae 101 are two-dimensionally arranged, in order to simplify the description, the interrogation wave Pt and the response wave Pr inclined only in the X direction with respect to the Z direction are considered. Here, generally, the array antenna is mounted as an array of patch antennas on a substrate and an electric field amplitude distribution $A_T(x_i, t)$ which vibrates on a surface of the array antenna can be expressed by the following equation (1).

$$A_T(x_i, t) = A_0 \sin(k_T \cdot x_i - \omega t + \phi) \tag{1}$$

Here, $k_T$ is a wave number vector of the interrogation wave Pt. $X_i$ is a vector indicating the position of the i-th antenna from the coordinate axis origin. ω is a carrier wave angular frequency of the interrogation wave Pt. A phase difference φ is a difference between the phase of the interrogation wave Pt and the phase of an LO signal as a signal output by a local oscillator 112b, which will be described later, in positions in bidirectional mixers 111b and 111c. When the phase of the interrogation wave Pt is modulated, the phase difference φ contains the modulated phase. Although polarization dependency is not particularly mentioned here, a dual polarized antenna capable of independently receiving polarization components in two orthogonal directions can also be used as necessary.

Figure 3:
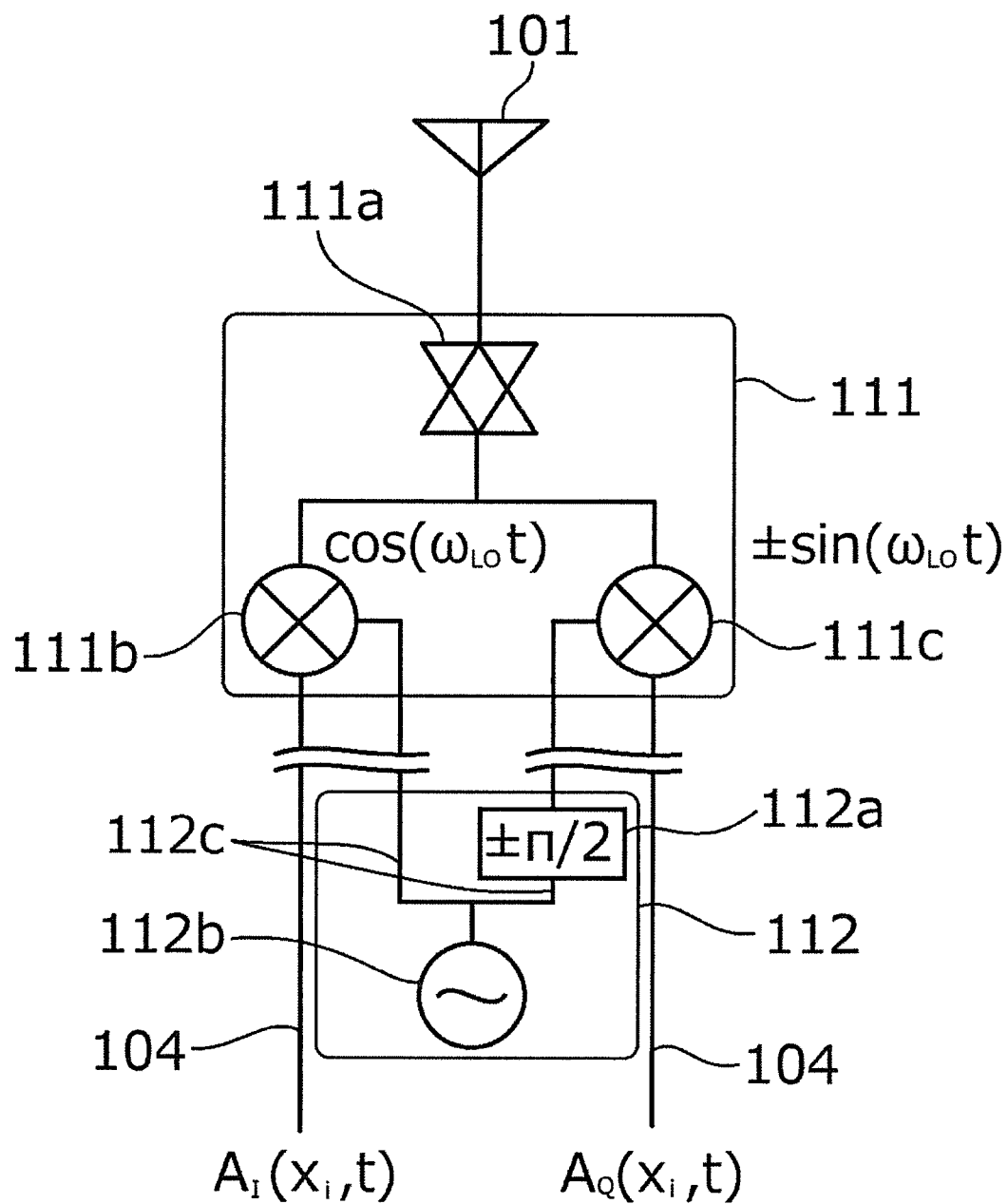
FIG. 3 shows a modem and a reference signal generator of the responder shown in FIG. 2.

As shown in FIGS. 2 and 3, modems 111 are respectively coupled to the individual antennae 101. As shown in FIG. 3, the modem 111 includes a bidirectional amplifier 111a and the bidirectional mixers 111b and 111c. The modem 111 amplifies an electric signal output from the antenna 101 by the bidirectional amplifier 111a, and then branches and inputs the electric signal to the bidirectional mixers 111b and 111c. As shown in FIG. 3, the bidirectional mixers 111b and 111c are coupled to paths 104, and as shown in FIG. 2, the paths 104 are coupled to a parallel-time-series signal converter 113.

As shown in FIG. 3, a reference signal generator 112 includes the local oscillator 112b and a ±π/2 shifter 112a. The local oscillator 112b oscillates at a frequency $\omega_{LO}$ equal to the carrier wave frequency ω of the interrogation wave Pt, and branches into two transmission lines 112c. One becomes an LO signal having an In-phase phase as it is, and the other becomes an LO signal having a quadrature phase delayed by a phase π/2 by the ±π/2 shifter 112a. The subsequent lines are coupled by wires having an equal length so as not to generate a phase difference, and the signals are distributed to all the bidirectional mixers (bidirectional mixers 111b and 111c).

According to the configuration, quadrature demodulation at the same phase is performed in all the bidirectional mixers, and an amplitude $A_I(x_i, t)$ and an amplitude $A_Q(x_i, t)$ of two orthogonal phase components are output as baseband signals. Hereinafter, a combination of the amplitudes is referred to as "quadrature phase amplitude". This function is shown using the following equations (2) and (3). In the following equations (2) and (3), the term including $\omega_{LO}$ is removed by a filter (not shown) or the like in actual operation, only the term not including $\omega_{LO}$ remains, and the information of the quadrature phase amplitude is temporarily held in a state of an analog signal for each corresponding cell in the parallel-time-series signal converter 113.

$$A_I(x_i, t) = A_0 \sin(k_T \cdot x_i - \omega t + \phi)\cos(\omega_{LO} t) \tag{2}$$

$$= \frac{A_0}{2}\{\sin(k_T \cdot x_i + \phi) - \sin(-k_T \cdot x_i + 2\omega_{LO} t - \phi)\}$$

$$\cong \frac{A_0}{2}\sin(k_T \cdot x_i + \phi)$$

$$A_Q(x_i, t) = A_0 \sin(k_T \cdot x_i - \omega t + \phi)\sin(\omega_{LO} t) \tag{3}$$

$$= -\frac{A_0}{2}\{\cos(k_T \cdot x_i + \phi) - \cos(k_T \cdot x_i - 2\omega_{LO} t + \phi)\}$$

$$\cong -\frac{A_0}{2}\cos(k_T \cdot x_i + \phi)$$

A method of obtaining the arrival direction of the interrogation wave Pt in the responder 100 of the embodiment will be described below with reference to the flowchart of FIG. 4. First, at step S110, the parallel-time-series signal converter 113 converts analog signals of quadrature phase amplitude held in parallel in each cell into time-series signals. Specifically, for example, a bucket brigade system as a method of holding an analog signal as charge and sequentially transferring the charge to adjacent cells based on the principle of a charge coupled device (CCD) can be used. As another example, an active matrix system used in a liquid crystal display can be used.

Then, at step S120, the quadrature phase amplitude information is converted into digital data by an A/D converter (not shown), and is sequentially stored in a quadrature phase amplitude memory unit 102. Step S120 can be performed in parallel with step S110.

Then, at step S130, a multiplier 107 shown in FIG. 2 multiplies one or a plurality of alternating-current signals output from a second frequency divider of a frequency divider 106 shown in FIG. 2 having a first frequency divider and the second frequency divider at different frequencies by the time-series signal converted by the parallel-time-series signal converter 113. As the multiplier 107, for example, an analog multiplier including a transistor can be used. As shown in FIG. 2, the first frequency divider denoted by a sign "1" is coupled to the parallel-time-series signal converter 113, the quadrature phase amplitude memory unit 102, and a reception time discriminator 108, and the second frequency divider denoted by a sign "2" is coupled to the multiplier 107 coupled to the parallel-time-series signal converters 113 and a beam selector 103.

Then, at step S140, the beam selector 103 shown in FIG. 2 scans the frequency division ratio of the second frequency divider, specifies the frequency division ratio corresponding to the output with the highest intensity of the multiplier 107 from one or a plurality of multiplication signals, and stores this information in an arrival direction memory unit 105 shown in FIG. 2. Generally, since the component of the direct wave is higher in intensity than the reflected wave, consequently, the processing at step S140 specifies the arrival direction of the direct wave. In the scanning of the frequency division ratio of the second frequency divider, the frequency division ratio may be scanned over time. Or, a plurality of one-dimensional antenna arrays arranged in the X direction may be arranged in the Y direction orthogonal to the X direction and direct wave components may be obtained simultaneously in parallel by multiplication of the signals at different frequencies.

A series of operations executed by the parallel-time-series signal converter 113, the multiplier 107, the beam selector 103, and the like from step S110 to step S140 are equivalent to obtainment of a spatial frequency of the quadrature phase amplitude distributed in the X direction, that is, a Fourier coefficient. That is, steps S110 to S140 are executed, and thereby, the arrival direction of the direct wave corresponding to the frequency division ratio of the output having the highest intensity can be obtained at a high speed at a fixed time.

The reception time discriminator 108 shown in FIG. 2 monitors a pattern of data in the quadrature phase amplitude memory unit 102. Then, for example, when the identification number of the responder 100 as a target is added to the interrogation wave Pt and transmitted by phase modulation or the like, if the identification number of the transmitted interrogation wave Pt matches the identification number of the own station, the responder 100 concurrently generates a trigger signal for switching from the operation of receiving the interrogation wave Pt to the operation of transmitting the response wave Pr. In a case of use for positioning of the responder 100 or for measurement of the distance from the interrogator 200 to the responder 100, when a holding time Th from the reception completion time of the interrogation wave Pt to the transmission start time of the response wave Pr is set, the generation of the trigger signal may be adjusted by providing a waiting time so as to satisfy the setting.

Figure 5:
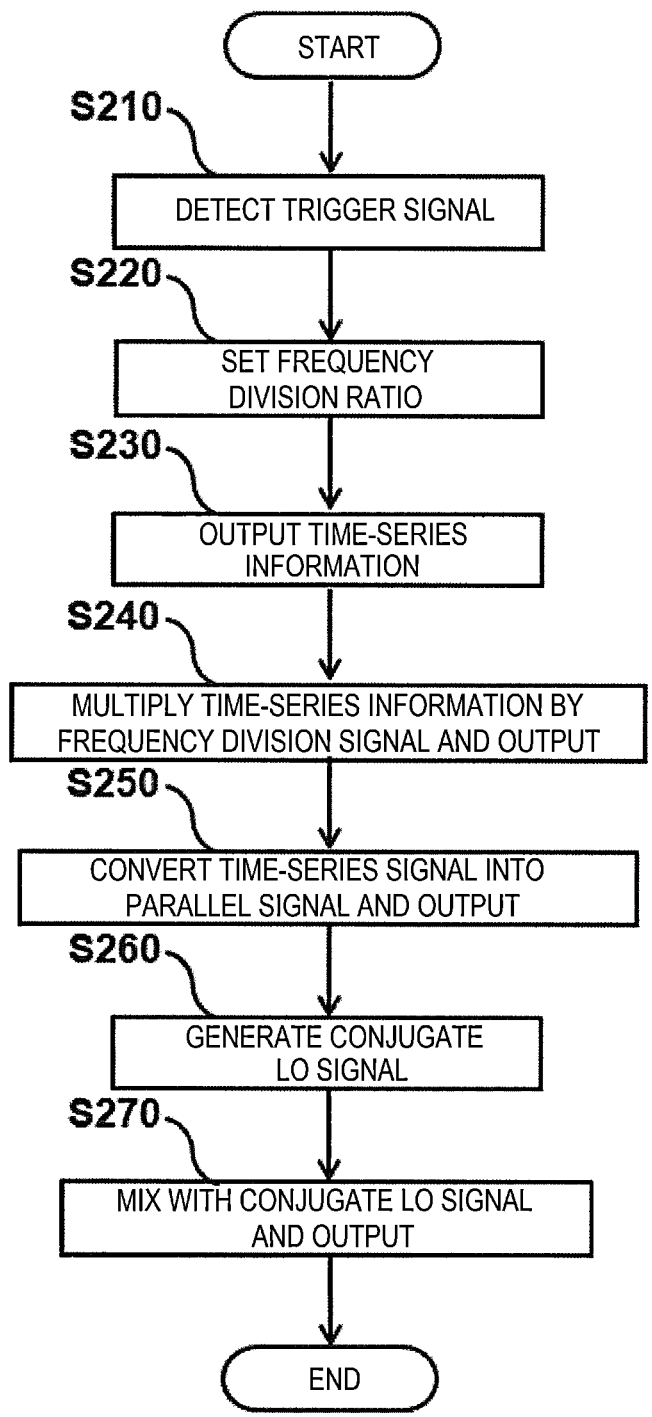
FIG. 5 is a flowchart showing a generation process of a response wave in the responder in FIG. 2.

Next, a generation process of the response wave Pr in the responder 100 of the embodiment will be described as below with reference to the flowchart of FIG. 5. First, at step S210, the reference signal generator 112 detects the trigger signal and, at step S220, the beam selector 103 sets the frequency division ratio of the second frequency divider of the frequency divider 106 based on the information stored in the arrival direction memory unit 105.

Then, at step S230, the quadrature phase amplitude memory unit 102 prepares an analog signal of time-series information by, for example, converting the digital information of the stored quadrature phase amplitude into an analog signal by a D/A converter (not shown), and outputs the analog signal to the multiplier 107. Then, at step S240, the multiplier 107 multiplies the output of the second frequency divider of the frequency divider 106 by the output of the quadrature phase amplitude memory unit 102, and transmits the result to the parallel-time-series signal converter 113.

Then, at step S250, the parallel-to-time-series signal converter 113 converts the time-series signal into a parallel signal by the CCD or the active matrix method as is the case with the reception of the interrogation wave Pt, and outputs the parallel signal to the modem 111. Then, at step S260, the reference signal generator 112 inverts the sign of the ±π/2 shifter 112a and generates a conjugate LO signal as a time-reversed LO signal. Note that, when expressed by an IQ plane as a plane formed by an In-phase axis and a Quadrature axis, a wave rotates in a direction opposite to that at the time of reception.

Then, at step S270, the modem 111 mixes the output from the D/A converter (not shown) with the conjugate LO signal, outputs the mixed signal to the antenna 101 through the bidirectional amplifier 111a, and returns the response wave Pr to the interrogator 200. Here, the electric field amplitude distribution $A_R(x_i, t)$ when the response wave Pr is generated can be expressed by the following equation (4) using quadrature phase amplitudes $A_I(x_i, t)$ and $A_Q(x_i, t)$.

$$A_R(x_i, t) = \frac{A_0}{2}\sin(k_T \cdot x_i + \phi)\cos(\omega_{LO}t) + \frac{A_0}{2}\cos(k_T \cdot x_i + \phi)\sin(\omega_{LO}t) \quad (4)$$

$$= \frac{\frac{A_0}{2}\{\sin(k_T \cdot x_i + \omega_{LO}t + \phi) + \sin(k_T \cdot x_i - \omega_{LO}t + \phi)\} +}{\frac{A_0}{2}\{\sin(k_T \cdot x_i + \omega_{LO}t + \phi) - \sin(k_T \cdot x_i - \omega_{LO}t + \phi)\}}$$

$$= A_0\sin(k_T \cdot x_i + \omega_{LO}t + \phi)$$

$$= -A_0\sin(k_R \cdot x_i - \omega_{LO}t - \phi)$$

Here, the sign of the quadrature component $\sin(\omega_{LO}t)$ of the LO signal is inverted by the sign inversion in the ±π/2 shifter 112a. As a result of the series of processing, as shown in FIG. 2, the wave number vector KR of the output response wave Pr propagates in the opposite direction to the wave number vector $k_T$ at the reception of the interrogation wave Pt.

Strictly, when the equation (1) and the equation (4) are compared, a phase difference of 2φ is generated, and an error occurs in a holding time (holding time $t_h$) from the reception completion time of the interrogation wave Pt to the transmission start time of the response wave Pr. When there is a request to correct this, a method of adjusting and correcting the data of the quadrature phase amplitude stored in the memory unit 102 is conceivable. Alternatively, a phase shifter may be provided immediate downstream of the output of the local oscillator 112b for correction.

As described above, the responder 100 of the embodiment that receives the interrogation wave Pt from the interrogator 200 and transmits the response wave Pr to the interrogator 200 includes the plurality of antennae 101 receiving the interrogation wave Pt. The responder 100 of the embodiment includes the reference signal generator 112 generating the reference signal, the plurality of modems 111 outputting the quadrature phase amplitudes based on the reception signals output from the antennae 101 when the interrogation wave Pt is received and the reference signal, and the parallel-time-series signal converters 113 converting the parallel signals having the quadrature phase amplitudes output from the respective modems 111 into the time-series signals. Furthermore, the responder 100 of the embodiment includes the frequency divider 106 outputting a frequency division signal having a frequency and a phase for detecting the time-series signal, the multiplier 107 outputting a multiplication signal obtained by multiplying the time-series signal and the frequency division signal, and the beam selector 103 determining the arrival direction of the interrogation wave Pt based on the multiplication signal.

As described above, the responder 100 of the embodiment includes the antennae 101, the reference signal generator 112, the modems 111, the parallel-time-series signal converters 113, the frequency divider 106, the multiplier 107, and the beam selector 103. Thereby, calculation for suppressing the influence of multipath using fast Fourier transform or the like may be performed using hardware instead of software. Therefore, the responder 100 of the embodiment can suppress the influence of multipath in a short time. The reference signal is an alternating-current signal having a frequency and a phase of the carrier wave.

Figure 4:
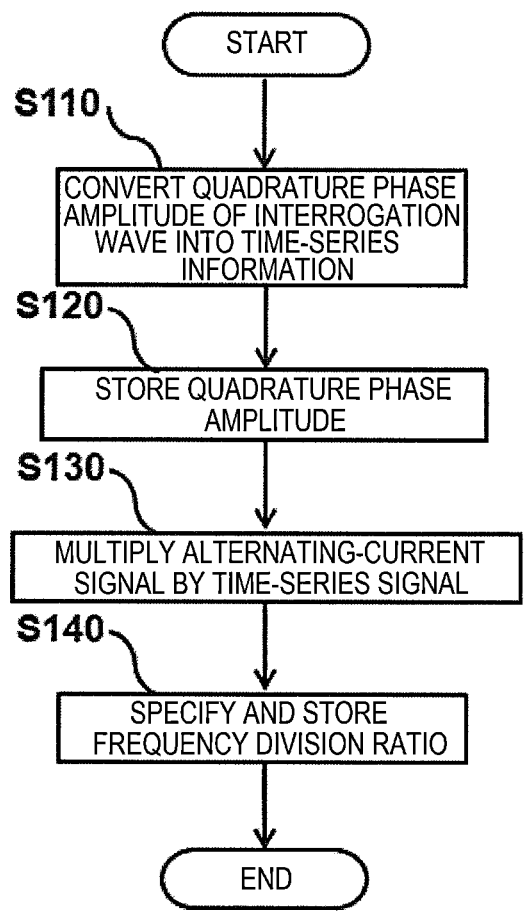
FIG. 4 is a flowchart showing a process of determining an arrival direction of an interrogation wave in the responder shown in FIG. 2.

In the responder 100 of the embodiment, at steps S130 and S140 of FIG. 4, the frequency divider 106 can change the frequency division ratio of the frequency division signal with time, and the beam selector 103 can determine the arrival direction of the interrogation wave Pt based on the intensity of the multiplication signal. That is, the responder 100 of the embodiment can determine the arrival direction of the interrogation wave Pt by serially detecting the multiplication signals having the frequency division ratios changed with time.

On the other hand, in the responder 100 of the embodiment, at steps S130 and S140 of FIG. 4, the frequency divider 106 may output a plurality of frequency division signals having different frequency division ratios from one another in parallel, and the beam selector 103 may determine the arrival direction of the interrogation wave Pt based on the intensity of the multiplication signals thereof. That is, the responder 100 of the embodiment can also determine the arrival direction of the interrogation wave Pt by detecting a plurality of multiplication signals in parallel.

As described above, the responder 100 of the embodiment includes the arrival direction memory unit 105 and the quadrature phase amplitude memory unit 102. The arrival direction memory unit 105 stores the frequency division ratio as arrival direction information of the interrogation wave Pt output from the beam selector 103, and the quadrature phase amplitude memory unit 102 stores the quadrature phase amplitude. Here, at step S220 of FIG. 5, the frequency divider 106 outputs a response wave frequency division signal (frequency division ratio set by the second frequency divider) having a frequency corresponding to the frequency division ratio as the arrival direction information of the interrogation wave Pt to the multiplier 107. At steps S230 and S240 of FIG. 5, the multiplier 107 multiplies the response wave frequency division signal (the frequency division ratio set by the second frequency divider) by a response wave time-series signal based on the quadrature phase amplitude stored in the quadrature phase amplitude memory unit 102 (the output of the quadrature phase amplitude memory unit 102), and outputs a response wave multiplication signal to the parallel-time-series signal converter 113. At step S250 of FIG. 5, the parallel-time-series signal 113 converter converts the response wave multiplication signal into a response wave parallel signal (a time-series signal converted into a parallel signal) and outputs the signal to the modem 111. At steps S260 and S270 of FIG. 5, the modems 111 generate the response wave Pr having the response wave quadrature phase amplitude corresponding to the response wave parallel signal (the time-series signal converted into the parallel signal) based on a response wave reference signal (the conjugate LO signal), and the plurality of antennae 101 transmit the response wave Pr to the interrogator 200. According to the configuration, the responder 100 of the embodiment can preferably transmit the response wave Pr to the interrogator 200 while suppressing the influence of multipath in a short time.

In the embodiment, the frequency division signal, the time-series signal, the multiplication signal, the parallel signal, the reference signal, and the quadrature phase amplitude for the response wave Pr are the same as or simply inverted from the frequency division signal, the time-series signal, the multiplication signal, the parallel signal, the reference signal, and the quadrature phase amplitude for the interrogation wave Pt. However, the frequency division signal, the time-series signal, the multiplication signal, the parallel signal, the reference signal, and the quadrature phase amplitude for the response wave Pr may be reconstructed by applying correction or the like to those for the interrogation wave Pt.

As described above, the responder 100 of the 108 embodiment includes the reception time discriminator discriminating the reception time, at which the interrogation wave Pt is received by the antenna 101, based on a predetermined signal component contained in the multiplication signal. The beam selector 103 can determine the output time of the response wave frequency division signal based on the reception time. Therefore, the reception time of the interrogation wave Pt can be grasped, and the responder 100 of the embodiment can preferably set, for example, the timing of transmitting the response wave Pr to the interrogator 200 based on the reception time of the interrogation wave Pt.

Figure 6:
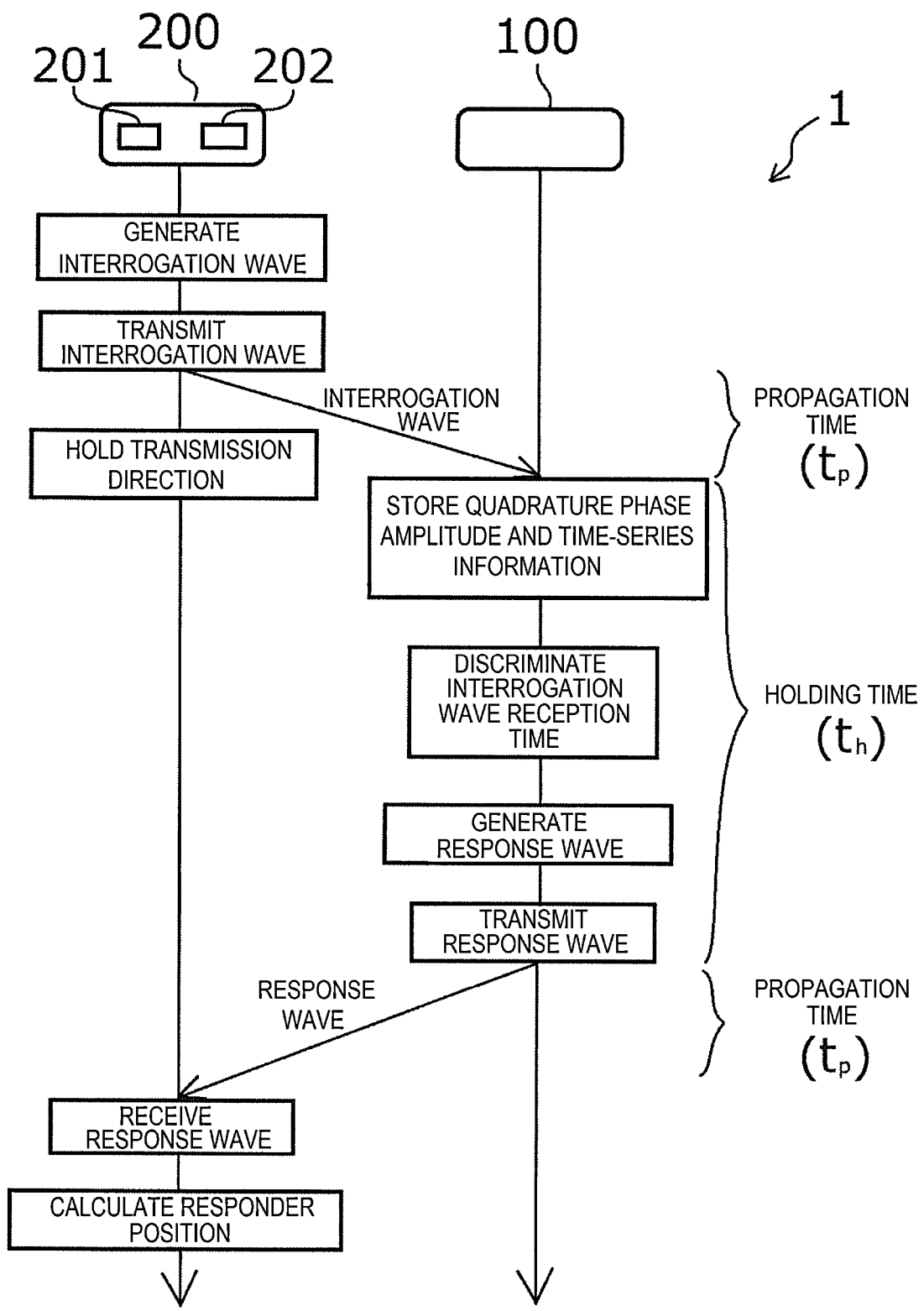
FIG. 6 is a flowchart showing an operation flow of one embodiment of a positioning system including the responder in FIG. 2.

Next, one embodiment of a positioning system 1 using the responder 100 of the embodiment will be described with reference to FIG. 6. In the positioning system 1 of the embodiment, the interrogator 200 modulates a signal containing the identification number of the responder 100 as a target by a predetermined method, generates and transmits an interrogation wave Pt to the responder 100.

Similarly to the responder 100 of the embodiment, the interrogator 200 of the positioning system 1 of the embodiment generates a directional wave using an array antenna in which a plurality of antennae 101 are arranged at predetermined intervals along the receiving surface of the responder 100. When the position of the desired responder 100 is unknown, it is preferable that the interrogator 200 scans the direction of the directional wave from the interrogator 200 and holds information on the direction when the response wave Pr is returned.

When the identification number of the own station is detected by the responder 100, necessary information is written in advance in a quadrature phase amplitude format in the quadrature phase amplitude memory unit 102, and the response wave Pr is transmitted by reading of the information. The operation is performed so that the time from the reception completion time of the interrogation wave Pt to the transmission start time of the response wave Pr is the holding time Th. However, a delay function may be added as necessary.

In the positioning system 1 of the embodiment, the interrogator 200 is provided with a distance calculator 201 calculating a distance from the interrogator 200 to the responder 100, and a position detector 202 measuring the position of the responder 100. The location where the distance calculator 201 and the position detector 202 are provided is not particularly limited, and the units may be provided in the responder 100, or may be provided in another location than those of the interrogator 200 and the responder 100. When the reception completion of the response wave Pr is determined, the interrogator 200 calculates a propagation time $t_p$ from the transmission completion time of the interrogation wave Pt, the reception start time of the response wave Pr, and the holding time $t_h$, and calculates a distance from the interrogator 200 to the responder 100. The position of the responder 100 is calculated from the transmission direction of the interrogation wave Pt and the distance from the interrogator 200 to the responder 100. When both the interrogator 200 and the responder 100 are stopped, the propagation time $t_p$ of the interrogation wave Pt is equal to the propagation time $t_p$ of the response wave Pr.

As described above, the positioning system 1 of the embodiment includes the above described responder 100, interrogator 200, distance calculator 201 calculating the distance from the interrogator 200 to the responder 100, and position detector 202 measuring the position of the responder 100. Here, the interrogator 200 outputs the interrogation wave Pt containing a specific signal pattern including an identification number, or the like. Further, the distance calculator 201 calculates the distance from the interrogator 200 to the responder 100 based on the difference between the time when the interrogation wave Pt is transmitted from the interrogator 200 and the time when the response wave Pr transmitted from the responder 100 is received by the interrogator 200 and the predetermined holding time $t_h$. The position detector 202 measures the position of the responder 100 based on the distance.

The positioning system 1 of the embodiment having the configuration can accurately measure the position of the responder 100. In a case where there are a plurality of interrogators 200, the position of the responder 100 can be measured by the plurality of interrogators 200 even when the interrogators 200 do not have directionality. In a case where there is one interrogator 200, when the interrogator 200 has directionality, the position of the responder 100 can be measured. Furthermore, even when there is only one interrogator 200 and the interrogator 200 does not have directionality, in a case where the movement direction of the responder 100 is only one direction, the position of the responder 100 can be measured.

Figure 7:
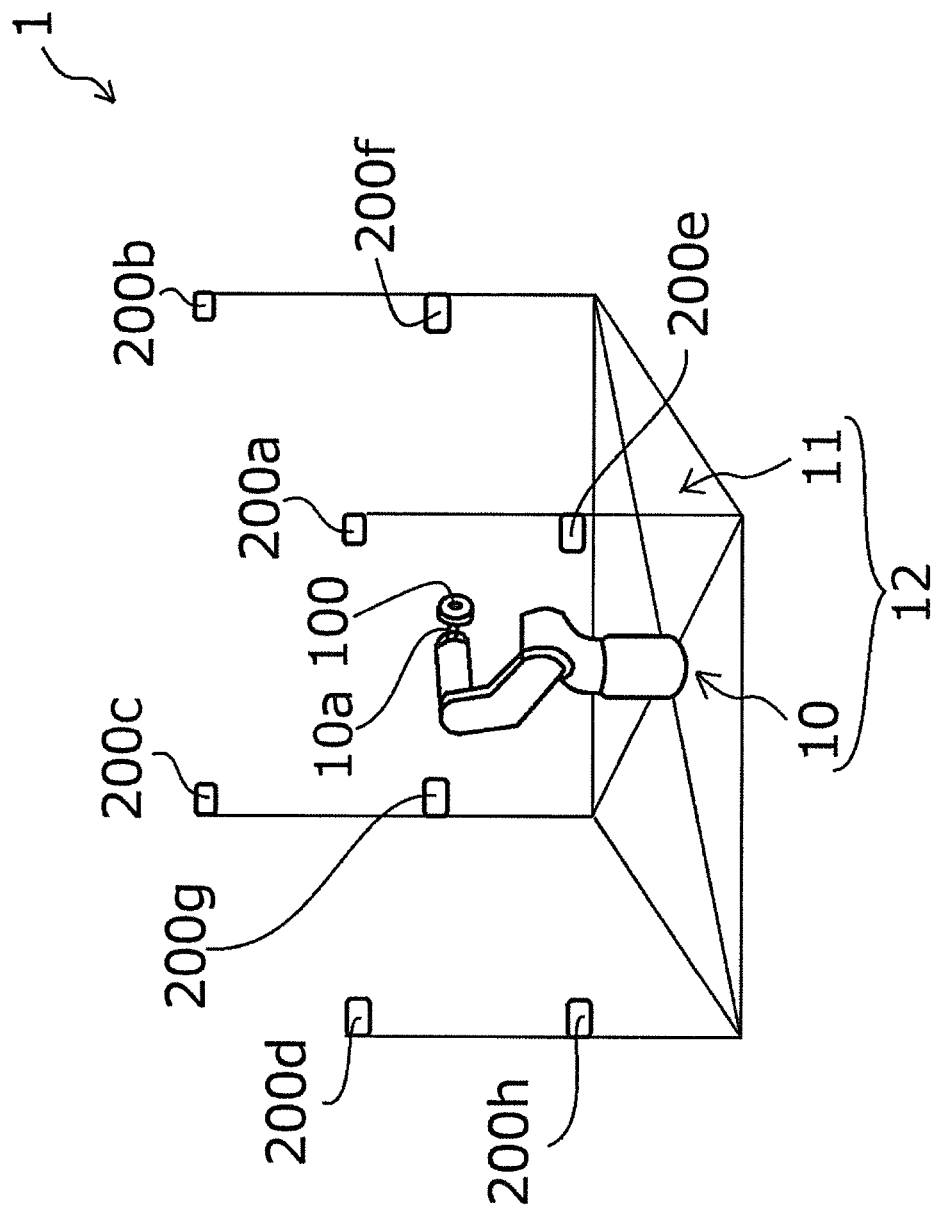
FIG. 7 shows a configuration of a robot arm as one embodiment of the positioning system including the responder in FIG. 2.

Next, one embodiment of another positioning system 1 using the responder 100 of the embodiment than the positioning system 1 shown in FIG. 6 will be described with reference to FIG. 7. In the embodiment, an articulated robot 10 is installed in a center part of the positioning system 1, and the responder 100 is attached to an arm end portion 10a. Note that a control device (not shown) is incorporated in the articulated robot 10, and the position of the responder 100 is calculated from the distance to the responder 100 measured by communication with eight interrogators 200 (an interrogator 200a, an interrogator 200b, an interrogator 200c, an interrogator 200d, an interrogator 200e, an interrogator 200f, an interrogator 200g, and an interrogator 200h) in a multipoint positioning manner. In the embodiment, each interrogator 200 and the control device are electrically coupled by wired communication, but may be coupled by wireless communication.

The interrogator 200a, the interrogator 200b, the interrogator 200c, the interrogator 200d, the interrogator 200e, the interrogator 200f, the interrogator 200g, and the interrogator 200h are arranged around the articulated robot 10, have functions of returning the response waves Pr equivalent to those of the responder 100, and can measure the distance between the interrogators 200. The distance information between the interrogators 200 is aggregated in the control device in advance, and thereby, an absolute coordinate system in the positioning system 1 can be set and the position coordinates of all the interrogators 200 can be calculated.

Since the interrogator 200 can also measure the distance from the responder 100, the position of the responder 100 can also be calculated in the absolute coordinate system. Here, the eight interrogators 200 are provided, however, for measurement of the three-dimensional position of the responder 100, unknown variables in three axial directions orthogonal to one another may be obtained. Accordingly, when all the interrogators 200 are not on the same plane, the position of the responder 100 can be calculated with at least four interrogators 200. When all the interrogators 200 are provided outside the movement range of the responder 100, the position of the responder 100 can be calculated by the three interrogators 200.

In the positioning system 1 of the embodiment, an appropriate interrogator 200 can be selected according to the situation of wireless communication. The responder 100 is attached to a joint portion or the like other than the arm end portion 10a, and thereby, the position and the motion of the joint and the arm of the articulated robot 10 can be measured. In a use scene for a workpiece, the responder 100 is attached to a tray on which the workpiece is placed, and thereby, the position of the workpiece can be measured. Further, the responder 100 is controlled to track the transmission direction of the interrogation wave Pt simultaneously with the operation of the respective motors within the articulated robot 10 and the transport mechanism of the tray based on the information relating to the positions, and thereby, interlocking of the plurality of mechanisms can be controlled.

The positioning in the above described absolute coordinate system is also effective for setting of an initial position necessary before the activation of the articulated robot 10, that is, for teaching. In the articulated robot 10 of related art, an encoder is provided in each joint portion to detect the rotation direction of the joint and the arm and the final coordinates of the arm end portion 10a are estimated. When the number of joints increases, measurement errors of the encoders are accumulated, and further, deflection due to their own weights of the arm and the joint portions is caused. Accordingly, a large deviation from the actual position of the arm end portion 10a may be caused. In order to improve this, it is necessary to increase rigidity of the arm itself and a holding force of a reducer. On the other hand, the positioning system 1 of the embodiment is used, and thereby, even when the initial state of each encoder or the like is unknown, for example, the state of the articulated robot 10 can be grasped by attachment of the responders 100 to the respective portions of the articulated robot 10, transmission of the interrogation wave Pt from the interrogator 200, and measurement of the positions of the responders 100.

The positioning system 1 of the embodiment is explained in another expression. As shown in FIG. 7, the positioning system 1 of the embodiment includes a mechanical body 12 having the articulated robot 10 as a movable part having the arm, the joint portion, and the like, and a fixed part 11 onto which the articulated robot 10 is installed. The interrogators 200 are provided in the fixed part 11, and the responder 100 is provided in the arm end portion 10a of the articulated robot 10 as the movable part. The positioning system 1 of the embodiment having the configuration can accurately measure the position of the responder 100 provided in the movable part. However, not limited to the configuration, but, for example, the responder 100 may be provided in the fixed part 11 and the interrogator 200 may be provided in the movable part according to the apparatus configuration of the mechanical body 12 or the like.

The present disclosure is not limited to the above described examples and can be implemented in various configurations without departing from the gist of the present disclosure. In order to solve a part or all of the above described problems, or to achieve a part or all of the above described effects, technical features in the embodiments corresponding to the technical features in the respective aspects described in SUMMARY can be replaced or combined as appropriate. Unless the technical features are explained as essential technical features in the specification, the technical features can be deleted as appropriate. For example, in place of the array antenna including the plurality of antennae, one antenna having directionality such as a parabolic antenna may be provided. Note that the present disclosure can be applied to control of an automated guided vehicle in a factory, automated driving, and the like.

What is claimed is:

1. A responder that receives an interrogation wave from an interrogator and transmits a response wave to the interrogator, comprising:
   a plurality of antennae receiving the interrogation wave;
   a reference signal generator generating a reference signal;
   a plurality of modems outputting quadrature phase amplitudes based on reception signals output from the antennae when the interrogation wave is received and the reference signal;
   a parallel-time-series signal converter converting a parallel signal having the quadrature phase amplitude output from each of the modems into a time-series signal;
   a frequency divider outputting a frequency division signal having a frequency and a phase for detecting the time-series signal;
   a multiplier outputting a multiplication signal obtained by multiplying the time-series signal by the frequency division signal; and
   a beam selector determining an arrival direction of the interrogation wave based on the multiplication signals.

2. The responder according to claim 1, wherein
   the frequency divider changes a frequency division ratio of the frequency division signal with time, and
   the beam selector determines the arrival direction based on intensity of the multiplication signals.

3. The responder according to claim 1, wherein
   the frequency divider outputs a plurality of the frequency division signals having different frequency division ratios from one another, and
   the beam selector determines the arrival direction based on intensity of the multiplication signals.

4. The responder according to claim 1, further comprising:
   an arrival direction memory unit storing a frequency division ratio as arrival direction information of the interrogation wave output from the beam selector; and
   a quadrature phase amplitude memory unit storing the quadrature phase amplitude, wherein
   the frequency divider outputs a response wave frequency division signal having a frequency corresponding to the frequency division ratio as the arrival direction information to the multiplier,
   the multiplier multiplies the response wave frequency division signal by a response wave time-series signal based on the quadrature phase amplitude stored in the quadrature phase amplitude memory unit and outputs a response wave multiplication signal to the parallel-time-series signal converter,
   the parallel-time-series signal converter converts the response wave multiplication signal into a response wave parallel signal and outputs the response wave parallel signal to the modem,
   the modem generates the response wave having a response wave quadrature phase amplitude corresponding to the response wave parallel signal based on a response wave reference signal, and
   the plurality of antennae transmit the response wave to the interrogator.

5. The responder according to claim 1, further comprising a reception time discriminator discriminating a reception time, at which the interrogation wave is received by the antenna, based on a predetermined signal component contained in the multiplication signal.

6. The responder according to claim 4, further comprising a reception time discriminator discriminating a reception time, at which the interrogation wave is received by the antenna, based on a predetermined signal component contained in the multiplication signal, wherein
   the beam selector determines an output time of the response wave frequency division signal based on the reception time.

7. A positioning system comprising:
   the responder according to claim 1;
   the interrogator;
   a distance calculator calculating a distance from the interrogator to the responder; and
   a position detector measuring a position of the responder, wherein
   the interrogator outputs the interrogation wave containing a predetermined signal pattern and having directionality,
   the distance calculator calculates the distance from the interrogator to the responder based on a difference between a time when the interrogation wave is transmitted from the interrogator and a time when the response wave transmitted from the responder is received by the interrogator and a predetermined holding time, and
   the position detector measures the position of the responder based on the distance.

8. The positioning system according to claim 7, further comprising a mechanical body having a movable part and a fixed part, wherein
   the interrogator is provided in the fixed part, and
   the responder is provided in the movable part.

* * * * *